Oct. 14, 1969    O. G. FEIERTAG    3,473,024
X-RAY TABLETOP EXTENSION AND TILT CONTROL
Filed Oct. 23, 1967    3 Sheets-Sheet 1

Inventor
Orrin G. Feiertag
By Ralph D. Hohenfeldt
Attorney

Oct. 14, 1969    O. G. FEIERTAG    3,473,024
X-RAY TABLETOP EXTENSION AND TILT CONTROL

Filed Oct. 23, 1967    3 Sheets-Sheet 3

Inventor
Orrin G. Feiertag
By Ralph D. Hohenfeldt
Attorney

United States Patent Office 3,473,024
Patented Oct. 14, 1969

3,473,024
X-RAY TABLETOP EXTENSION AND TILT CONTROL
Orrin G. Feiertag, Milwaukee, Wis., assignor to General Electric Company, a corporation of New York
Filed Oct. 23, 1967, Ser. No. 677,192
Int. Cl. G01n 23/00; A61g 13/00; H01j 37/20
U.S. Cl. 250—55                                    4 Claims

ABSTRACT OF THE DISCLOSURE

A motor-driven extendible top on a tiltable X-ray table is caused to avoid striking near-by objects when tilting by using a logic system that determines the extension status of the top at various tilt angles. Unsafe conditions are removed by interrupting the tilting motor control and automatically driving the top to a safe condition, after which tilting proceeds. Top extension is determined by a module comprising a toothed-wheel that turns one angular step for each increment of top movement. The wheel turns cams which are set at various angles to operate switches that respond to extension conditions. Another set of switches, located about the tilt axis, respond to tilt angle. The switch conditions are combined in the logic system to control the top and tilt drive motors.

Background of the invention

This invention is an improvement in means for preventing a shiftable X-ray tabletop from colliding with the floor, ceiling, or other objects in an X-ray room when the table is being tilted with the top extended.

Several prior art schemes have been devised for achieving the foregoing objective. One scheme involves having the moving top actuate a series of switches as the top progresses away from a centered position on the table body and having these switches set conditions in the table tilting control circuits for determining whether the table may pass through a given tilt angle safely.

Use of a series of position sensing switches along the translational path of the top has a number of disadvantages. In the first place, the switches must be located accurately. Secondly, it is difficult to route the wiring to the individual switches through the conglomeration of moving parts that are in every X-ray table body. Thirdly, if changes had to be made on the user's premises, in order to provide different top travel limits in one direction or the other, the switches had to be relocated and rewired, a procedure which took considerable time and effort because of the existing wiring being secured in harnesses as is the custom.

One solution to these problems which has been proposed by others, is to employ a unitary device that can be suitably located in the X-ray table body to integrate both the top and body tilting motions and operate switches which determine whether collision would occur if tilting proceeds. These known devices have been unduly large, costly, and complex and difficult to adjust on the user's premises for different top clearances and travel limits.

Summary of the invention

The present invention overcomes the above-noted disadvantages by providing table angulation sensing switches and a unitary electromechanical logic system module which determines the position of the tabletop at all times and initiates appropriate corrective action if an unsafe combination of top extension conditions and table tilt angle exist or are impending.

The logic system module may be located in the table body clear of other components. A preferred embodiment comprises a shaft on which there are several cams that operate associated switches as the shaft turns in either direction in correspondence with tabletop shift. The shaft has a toothed-wheel on one end and turns through one angular increment or step for each increment of tabletop shift. Nevertheless, the top is driven continuously rather than incrementally.

The toothed-wheel is driven step-by-step in either direction of rotation by an orbiting pin that successively engages slots between the teeth. The pin is fixed eccentrically in the end of another shaft which also shifts the tabletop when the shaft turns as a result of being driven by a motor. The cams are independently angularly adjustable on their shaft so that each can be set to operate its associated switch as the toothed-wheel turns through predetermined angular increments. Thus, for each direction of tabletop shift, one cam may operate a switch at the instant that the tabletop departs in either direction from center or home position. Another switch may be set to operate when its cam turns hrough an angle that corresponds with a tabletop position that would be unsafe if the table were tilted to a certain angle. Still another switch may be operated when the tabletop reaches the limit of its extension regardless of whether or not the table is tilted. There may be as many cams and switches as there are tabletop positions and conditions which one desires to sense.

The cam operated switches are in a control circuit with other switches that sense the tilt angle status of the X-ray table. These switches are connected in an and/or logic circuit which controls the tabletop shift and table tilt motors to take appropriate corrective action automatically if the top is improperly extended for a given tilt condition.

As implied above, a general object of this invention is to provide a simple, compact and versatile device for establishing the total travel limit of a shiftable top on an X-ray table and for automatically positioning the top to clear the floor, ceiling and other objects in an X-ray room when the table is tilted.

A further object is to convert increments of rectilinear tabletop travel, which may total about five feet, in'o angular movements with a top position sensing device which is small and yet conveniently adjustable in the factory or in the field.

How these and other more specific objects are achieved will appear in the ensuing description of the invention which refers to the accompanying drawings.

Description of the preferred embodiment

Figure 1:
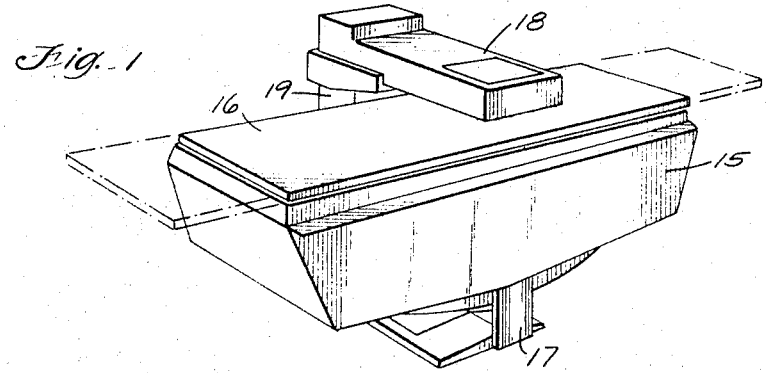
FIGURE 1 is a perspective view of a tilting X-ray table that has a shiftable tabletop.

FIGURE 1 shows the body 15 of an X-ray table that is provided with a top 16 which can be shifted or extended from center to left or right as suggested by the outline of the top. The table is mounted on a base 17 and is adapted to angulate or tilt about a transverse axis that is normal to the front of the body as viewed in this figure. The table chosen for illustration is adapted to tilt through ninety degrees to vertical in a clockwise direction as viewed and through approximately fifteen degrees in a counterclockwise direction to what is known as Trendelenberg position.

A conventional fluoroscopic and spot film device 18 is mounted on a tower 19 that extends into the table body 15 and is carried on tracks, not shown. The spot film device 18 may be shifted lengthwise of the table body to position it advantageously over a subject who may be lying on top 16. Sometimes the fluoroscopic device 18 cannot be shifted far enough to reach the extremities of the subject in which case the subject may be shifted along with tabletop 16 to place the area of interest in the X-ray beam which projects from a tube inside the table body, not shown, to the spot film device 18.

It is apparent that with top 16 extended to the right, either partially or to its limit, that the top will strike the floor before the table body is angulated to a vertical position. Also, if the table is angulated clockwise with the top extended to the left, there is a possibility of the top colliding with other objects in the room or with the ceiling before the table reaches vertical position. The present invention contemplates avoiding collisions by interrupting table tilt and restoring the tabletop to a safe position automatically without any conscious effort on the part of the operator.

Figure 2:
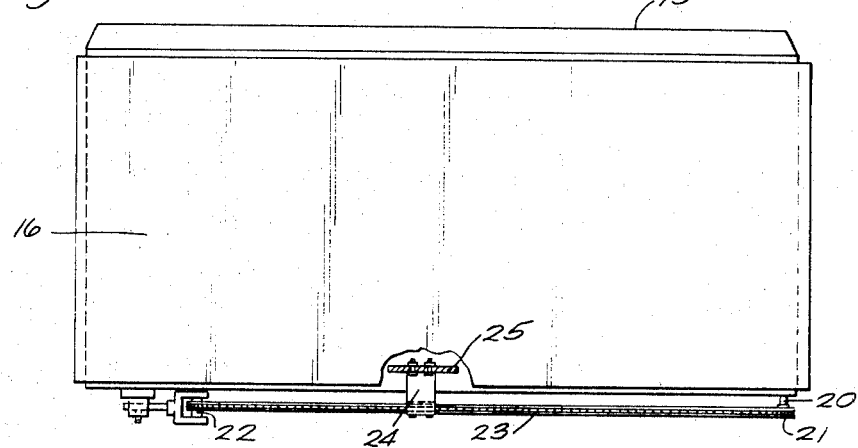
FIGURE 2 shows a top view of the table with parts removed and parts broken away.

FIGURE 2 shows some parts of the chain drive mechanism for shifting tabletop 16 with respect to body 15. There is a power shaft 20 projecting from the table body and it has a sprocket 21 on its end. Another idler sprocket 22 is fixed to the table body. A closed loop of chain 23 runs over the sprockets and is translated when torque is applied to sprocket 21. A connector 24 is fastened to tabletop 16 with a suitable bracket 25. The connector is so designed that it can be easily clamped at any predetermined point on chain 23 to effect coupling between the driving chain and the driven top 16. Locating connector 24 at other than the center of translation of the chain determines the distance of left and right travel of the tabletop. In a commercial embodiment of the invention, the top is usually set for travelling a nominal thirty inches in each direction to right or left from center. The total travel is nominally about five feet. In some installations, the top may be set to travel about fifteen inches in one direction and forty-five inches in the other, or vice-versa. Other settings are obtainable for installations which dictate more limited travel of the top in either direction.

The guide tracks and rollers for mounting top 16 on table body 15 are omitted from the drawing for the sake of clarity.

Figure 4:
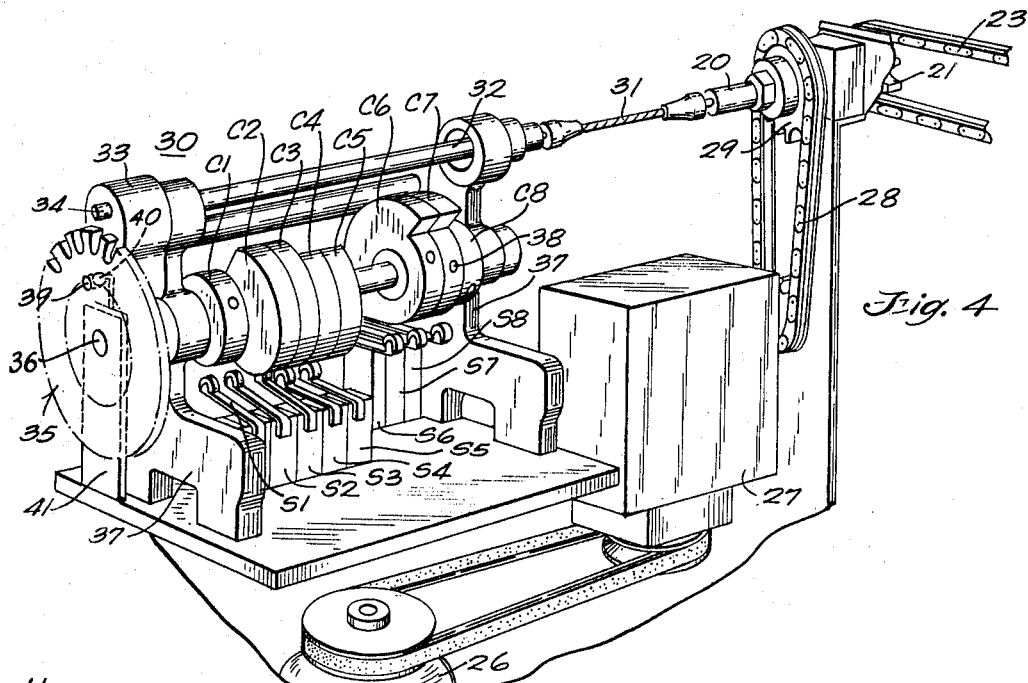
FIGURE 4 is a perspective view of the tabletop position sensing module and the drive mechanism for operating the module and shifting the tabletop.

FIGURE 4 shows the top drive motor 26 mounted inside the table body. Through a speed reducer 27 the reversible motor 26 drives shaft 20 through the agency of a chain 28 and a sprocket 29. As has been explained, rotation of shaft 20 causes corresponding rotation of external sprocket 21 and translation of chain 23 to shift the top.

Also driven concurrently with the tabletop is a tabletop position logic module or switch mechanism generally designated by the reference numeral 30. The mechanism is connected to shaft 20 with a flexible shaft 31, that turns a solid shaft 32 in switch mechanism 30. Shaft 32 is appropriately journalled and terminates in a cylinder 33 that has an axially extending eccentrically located pin 34. When shaft 32 rotates, pin 34 orbits to effect step-by-step angular movements of a toothed-index wheel 35. It is evident that toothed-wheel 35 is not driven continuously, but is driven in angular steps each of which corresponds with an increment of continuous tabletop travel. If two orbiting pins 34 were diametrically opposite each other in cylinder 33, the increment of tabletop shift that would cause the wheel 35 to turn one step would be half as large as in the arrangement shown. Since it is ordinarily not necessary to make fine adjustments for the tabletop to clear the ceiling or fixed objects, a single pin 34 and fairly large increments such as about four and one-half inches are permissible. If a pinion gear were substituted for pin 34, and a gear for wheel 35, the gear would have to be so large that it would be difficult to fit into the limited space inside an X-ray table body.

A detailed description of the structure and function of wheel 35 will be given shortly hereinafter, but for the moment it is sufficient to observe that the wheel is mounted on a shaft 36 that is suitably journalled in supporting members 37. In this embodiment, shaft 36 is provided with eight cams C1–C8. When turned to a proper angle, the various cams will operate respectively associated switches S1–S8. Switches S1–S5 of this group are operated at successively different points as the tabletop 16 is driven from its center position towards its left limit of travel. In this example, switches S6–S8 are operated by cams C6–C8 when the top is shifted to the right. The switches S1–S8 operate positively and quickly, if at all, as a result of the cams being advanced in angular steps rather than continuously as would be the case if a gear drive were used instead of the pin and wheel drive.

It should be noted that each cam is angularly adjustable on shaft 36 by reason of the cams being provided with set screws in threaded holes 38. Thus, it is seen that the cams can be set to operate their switches when wheel 35 has obtained various selected angular positions, which means that the top is in corresponding translational positions.

The various significant positions of the tabletop which cause operation of one or more of the switches S1–S8 are determined by setting the cams at an appropriate angular position with respect to wheel 35. This will now be explained in reference to FIGURES 5–9. Before proceeding, however, it should be noted that in FIGURE 4 that wheel 35 is provided with a number of holes 39 arranged in a circle. The holes align with a ball detent device 40 which is movable up and down on a post 41. The purpose is to make sure that orbiting pin 34 will enter a slot and not get out of step so as to collide with the edges of the teeth on the periphery of wheel 35. The ball detent assures that the wheel 35 will rotate only when driven.

Figure 5:
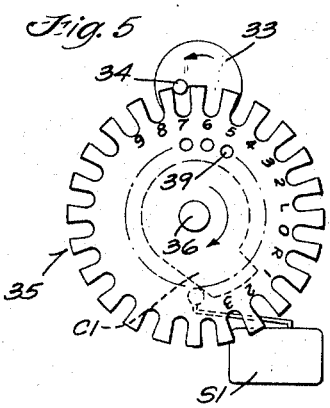
FIGURES 5–9 show the toothed index wheel of the module in FIGURE 4 with said wheel in various angular positions for consecutive operation of switches, by way of associated cams, for various table shift conditions that are sensed.

In FIGURE 5, the switch S1 is the switch that is to operate and stop tabletop movement when the top has reached its left limit regardless of whether the table is horizontal or tilted at some angle. As shown, cam C1 will operate switch S1 if wheel 35 executes any further clockwise motion. This means correspondingly that S1 will operate if an attempt is made to move table top 16 any further to the left. Note that the slots in the periphery of wheel 35 are numbered starting with slot zero. Slots on each side of slot zero are marked "L" and "R" for left and right, respectively. Thus, when the tabletop is in home position or centered, pin 34 will be deep in slot zero. Any slight movement of the top toward the right or left will cause wheel 35 to turn slightly and initiate a switching action which will be described later. As little as one-eighth of an inch of tabletop movement from center will initiate a rotaional step of wheel 35.

As shown in FIGURE 5, orbiting pin 34 is about to rotate the wheel clockwise as a result of engagement by the pin with slot 7 in the wheel. This position of pin 34 with respect to slot 7 was attained by the table top having been shifted seven increments from zero to slot 7. Hence, since a nominal thirty-inch limit of travel in the left direction was assumed, and each increment of top travel in this embodiment equals about four-and-a-half inches, the seven increments actually total a little less than thirty-two inches, which is the desired left travel limit. Any further travel and rotation of wheel 35 will opearte switch S1 and interrupt the controls for top drive motor 36.

Figure 6:
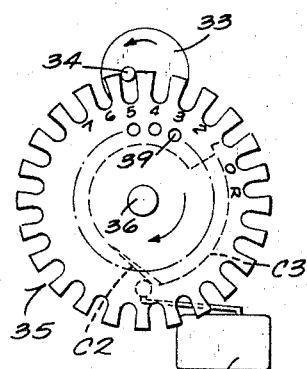

In FIGURE 6, cams C2 and C3, which are nearly congruent, are set so that they are about to operate switches S2 and S3 as orbiting pin 34 is entering slot 5 of wheel 35. These switching events occur when the tabletop has shifted five increments to the left and wheel 35 has rotated five angular steps from zero. This amounts to nominally twenty-two inches of table top travel. It will be shown later that reaching the twenty-two inch extension position is immaterial unless the table is tilted by more than a selected angle such as forty-five degrees. If the orbiting pin has reached slot 5 and the table is tilted beyond forty-five degrees, a switching action will occur as will be described later which will drive the top towards center automatically a sufficient distance for the top to clear a supposed object that is in the way of the angulating table. Switch S3 will be operated by its associated cam C3 if the top is extended an unsafe distance, corresponding with slot 5, when the table is tilted to a vertical position and a ceiling collision is to be avoided.

Figure 7:
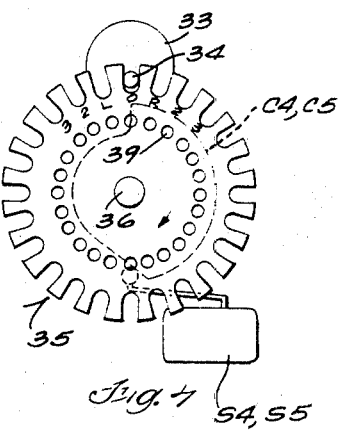
Figure 8:
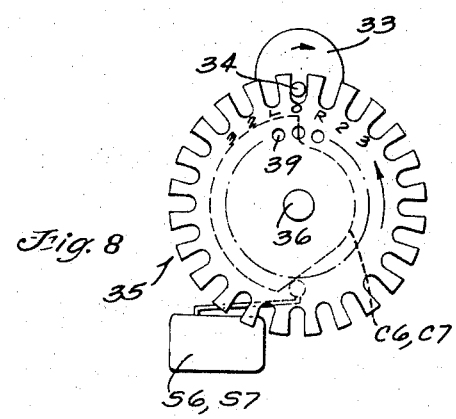

FIGURE 7 shows the drive pin 34 deep in the zero slot of wheel 35. This condition exists when tabletop 16 is in its centered or home position. Cams C4 and C5 are congruent and adjusted so that a slight amount of clockwise rotation by wheel 35 will operate both switches S4 and S5. Thus, these switches will indicate in the control circuitry that the tabletop has shifted to the left.

In FIGURE 8, pin 34 is again in the zero slot of wheel 35 which corresponds with the tabletop 16 being centered. In this case, a slight amount of movement of the tabletop to the right will cause wheel 35 and cams C6 and C7 to operate switches S6 and S7 to perform a switching function in the control circuit for the tabletop motor.

Figure 9:
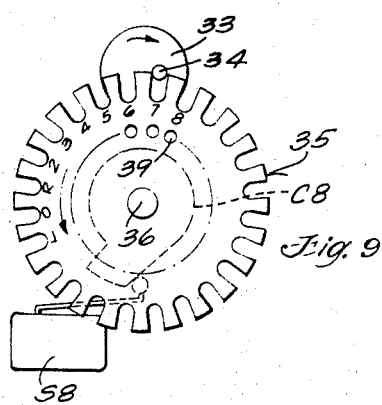

FIGURE 9 shows pin 34 entering slot 7 of wheel 35 which means that tabletop 16 has moved seven increments to the right. This is the limit of right travel in this example where we assume that the right limit of tabletop travel under any condition should be equal to the left, or about thirty-two inches. Thus, further movement of the tabletop will cause wheel 35 to turn counterclockwise whereupon its cam C8 will operate limit switch S8 and terminate movement.

Figure 10:
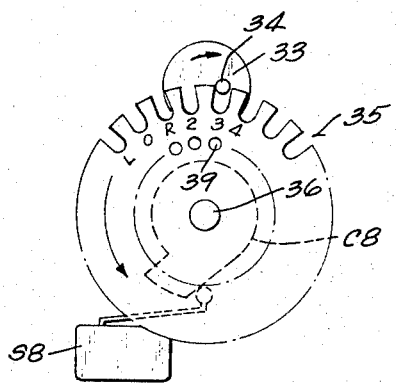
FIGURES 10 and 11 show the relation between the index wheel, the cams and switches when the module is set for sensing different limits of tabletop shift from the settings in the preceding figures; and, FIGURE 12 is a schematic representation of an electric logic circuit for controlling the tabletop shift and table tilt motors.
Figure 11:
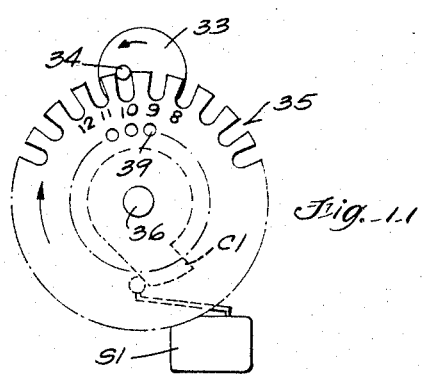

As indicated earlier, the switching mechanism 30 allows a choice of tabletop travel limits in either the right or left direction. The cam settings just described in reference to FIGURES 5 and 9 were for tabletop travel that is limited to a nominal thirty inches to the right or left of center. In FIGURES 10 and 11, cams C8 and C1 are set so that tabletop travel is limited to a nominal forty-five inches to the left and a nominal fifteen inches to the right. Thus, in FIGURE 10, further clockwise orbiting of pin 34, corresponding with top movement to the right, will cause counterclockwise rotation of cam C8 and operation of switch S8. This terminates further movement to the right. In FIGURE 10, wheel 35 has turned three angular increments counterclockwise which corresponds with three increments of table movement, or about fifteen inches.

In FIGURE 11, the tabletop has been shifted about ten increments to the left so that orbiting pin 34 is entering slot 10 as counted counterclockwise from the zero slot. Further shifting of the tabletop to the left causes cam C1 to turn clockwise and operate switch S1 which terminates the tabletop shift motor drive by an appropriate action in the motor control circuit.

Figure 3:
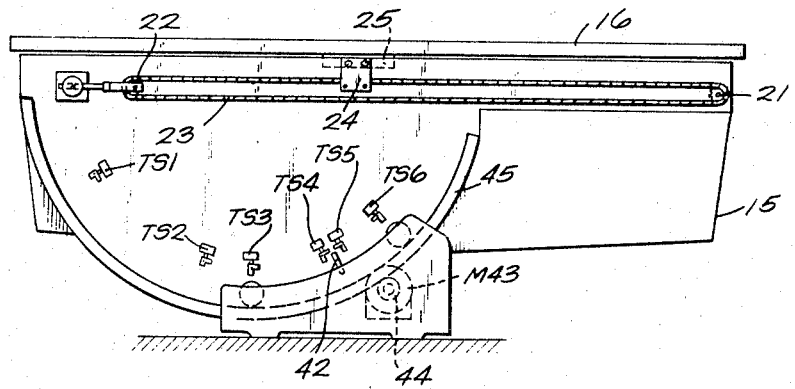
FIGURE 3 shows a rear view of the table with parts broken away to show certain parts of the table tilting and top shifting mechanisms.

FIGURE 3 shows another set of switches that are operated in response to tilting the X-ray table body in either direction. Thus, there are tilt switches TS1–TS6 arranged in an arc about the transverse tilt axis of the table body. As the switches swing through an arc while the table is tilting, they are operated sequentially by a stationary operating cam 42. Switches TS4 and TS5 are, in reality, close to pin 42 so that any departure from the table body from horizontal position will operate one or the other switches depending on tilt direction. Switch TS1 is operated when the table body has assumed an upright or vertical position. TS2 operates when the table body has been tilted forty-five degrees toward vertical in this example. TS3 operates when the table body has been tilted fifteen degrees towards vertical. TS6 operates when the table has been tilted the opposite direction or to a tilt angle of fifteen degrees which is otherwise known as Trendelenberg position. The TS series of switches are operated to one state when the table tilts in one direction and are restored to their original state when the table returns.

Thus, the TS series of switches provide an indication of the table body tilt status which can be compared with the table top extension status to determine whether it is safe to tilt further in a given direction or whether some corrective action has to be taken with the top.

The table body 15 is tilted with an electric motor M43 which may be suitably mounted in the base of the table, as shown, or in other locations at the option of the designer. The motor shaft is provided with a sprocket 44 that meshes with a chain, not visible, but which resides in the periphery of the arcuate segment 45 and serves the purpose of a gear segment.

The control circuit for top shift motor 26 and table tilt motor 43 is shown in FIGURE 12. This circuit is fundamentally an and/or logic circuit which permits the table to be tilted in either direction when no obstacle is encountered and prevents tilting if an unsafe condition of the top exists or is impending. If tilting is desired when the top is extended too far, it is atomatically driven to a safe condition after which tilting may proceed. Centering switches are also provided which when operated will cause the top to return to center and stop or will cause the table body to return to level position and stop.

In FIGURE 12, power line L1 may be at ground potential and lines L2 and L3 at 230 and 115 volts, respectively. The various contacts and relays are shown in this figure in the status they would have if the tabletop 16 were centered and the body 15 were level. Assume under this condition that manual switch 50, actually located in the front of the X-ray table, is operated to connect with its R contact for moving the tabletop to the right. Upon this event, relay 6K2 is energized through the series of closed contacts in the straight line above it in the drawing. This relay closes contacts 6K2a and supplies power to top shift motor 26. Relay 6K1 is not energized. The motor drives the tabletop to the right because direction selecting contact 6K1a is closed to compel operation in that direciton. If the table had been tilted more than fifteen degrees toward vertical, tilt switch TS3b would have opened to prevent further top movement toward the right. However, if the top were extended left, cam operated switch S4 would have been closed in which case tilting would be permitted beyond fifteen degrees because there would be no danger of the top colliding with the floor when the top is extended to the left. For convenience, the angle, distance or direction which causes a switch to operate has been indicated in parenthesis next to the switch in FIGURE 12.

When the top is extended to the right limit of its travel, cam operated switch contacts S8a open to terminate top movement in that direction after the top is extended about thirty inches in this example.

Extending the top to the left requires manually operating switch 50 to contact L. If conditions are proper, there is a closed circuit through relay 6K1 which closes its contact 6K1b to cause the top shift motor 26 to drive the top to the left. When 6K1 energizes, contacts 6K1a open and 6K1c closes to energize relay 6K2 to apply power to motor 26 through contact 6K2a.

When the tabletop is extended to the left, by operation of manual switch 50, until it reaches the left limit of its travel, cam operated switch S1 opens its contact S1a to discontinue energization of relay 6K1 and terminate operation of shift motor 26.

Note that in the path between the contact L of switch 50 and relay 6K1 that there is a tilt switch contact TS2 which is normally closed but opens when the table is tilted beyond forty-five degrees toward vertical. There is also an alternate path through contact S3a of cam operated switch S3 which opens if the tabletop is extended more than twenty-three inches to the left. Thus, if the tabletop is tilted more than forty-five degrees and it is also extended to the left more than twenty-three inches, there is assumed to be a danger of collision during the tilting action and the top shift motor 26 is prevented from being energized because relay 6K1 cannot be energized. If the table is tilted less than forty-five degrees, the top may be shifted to the left to its full thirty inches because TS2c and S1a will remain closed.

Attention is now invited to the manually operable automatic top centering switch 7S2. When this switch is depressed to the left, a circuit will be completed from line L1 along line 51 through contact S6a, 7S2Lb and relay 6K1. This will cause motor 26 to drive the top to the left. Under this condition, cam operated switch S6a would be closed because of manual operation of the top centering switch. After being right, the top centers with the table as a result of cam operated switch contact S6a opening at center. A similar mode of operation prevails when the tabletop is extended to the left and top centering switch 7S2 is rocked to the right to restore the top to center. In this case, contacts S5a are closed because of left extension and contacts 7S2Rb are closed because of manual operation so that power can be applied by way of relay 6K2 to motor 26 for shifting the top to the right until it reaches center, in which case contact S5a opens.

Tilting of the X-ray table is controlled by manually operated switch 52. When power from L1 is applied to the T contact, the table tilts toward Trendelenberg position which, in this case, is limited to fifteen degrees counterclockwise as viewed from the front of the table. When the V contact of switch 52 is closed, the table tilts toward vertical position or clockwise as viewed in FIGURE 1. Assuming that the table is initially horizontal, closure of the V contact completes a circuit through relay 5K2 and line L3. This causes relay contact 5K2a to close and apply power to table tilt motor 43 through contact 5K1a which determines its direction of rotation.

If the tabletop is shifted to the right any amount, cam operated switch contacts S7a open and S7b close. Nevertheless, closure of contact V of switch 52 will permit relay 5K2 to be energized for angulating the table to the alternate path of contact S7b. When the table reaches fifteen degrees of tilt toward vertical, tilt switch TS3 opens to prevent further tilting until the tabletop is restored to center because there is little clearance between the table and floor when the table is tilted near vertical. On the assumption that the table top is extended to the right and tilted more than fifteen degrees, TS3a is open and TS3b is closed. This completes a circuit from contact V in switch 52 to relay 6K1 which causes motor 26 to drive the top to the left until it reaches center. Upon this event, contact S7a again closes to provide a path to relay 5K2 in order that table tilt motor 43 may run until the table reaches vertical position if desired. At vertical, contact TS1 opens to stop the tilt motor 43.

Assume that the tabletop 16 is extended to the left and that clockwise tilting toward vertical is commanded by operation of switch 52. If the tabletop is extended no greater than twenty-three inches to the left, cam switch S2a contacts will remain closed in which case it is possible to apply power to relay 5K2 and continue energizing the tilt motor 43. If the top extends more than twenty-three inches, and the table is tilted more than forty-five degrees toward vertical, TS2a contacts open and TS2b contacts close. Since S2a is the open, tilting movement will be interrupted. However, with switch 52 being maintained on its contact V, and with TS2b closed, power will be applied to relay 6K2 in which case the top shift motor 26 will drive the top back to less than twenty-three inches of extension. When this condition is reached, cam operated contacts S2a will again close and allow the tilt motor to drive as a result of relay 5K2 being energized. Tilt may then continue until the vertical position is reached in which case contact TS1a will open to stop tilting.

When the table is operated to its Trendelenberg position by closure of switch 52 on its contact T, the table will tilt until an angle of fifteen degrees is reached when contact TS6 will open to interrupt the circuit through relay 5K2 and de-energize tilt motor 43.

Near the bottom of FIGURE 12 is a manually operable switch 53 which is spring-biased closed and which when held open will cause the table to stop level though manual tilt switch 52 is maintained for tilting the table either toward vertical or Trendelenberg. Whenever the table departs from horizontal, one of the switches TS4 or TS5 will be closed. Relay 5K2 will be energized for applying power on the table tilt motor 43. When the table reaches horizontal, whichever switch TS4 or TS5 was closed, will open. If level stop switch 53 is being held open at this time, relay 5K2 will be de-energized and power will be removed from table tilt motor 43. This stops the table at level. When switch 53 is normally closed, however, a circuit is maintained through tilting motor control relay 5K2 and the table will continue to tilt past horizontal as long as manual switch 52 is maintained in one position or the other.

Although a preferred embodiment of the invention has been described, it should be understood that such description is illustrative rather than limiting, for the invention may be variously embodied and is to be limited only by construing the claims which follow.

I claim:
1. An X-ray table comprising:
 (a) a table body and an electrically powered drive mechanism for tilting the body angularly about its transverse axis in opposite directions from horizontal,
 (b) a tabletop mounted moveably on the body and adapted for being extended and retracted in opposite longitudinal directions with respect to its normal position on the body, whereby to permit possible interference between fixed objects and the table when it is tilted with the top extended,
 (c) an electrically powered tabletop drive mechanism including a driven shaft and means for coupling the shaft to the tabletop to convert rotation of the shaft into longitudinal movements of the top,
 (d) a pin that is rotated orbitally concurrently with both rotation of the driven shaft and longitudinal movement of the tabletop,
 (e) a wheel having a plurality of peripheral teeth whose interspaces are engageable by said pin, whereby to rotate the wheel when the pin orbits,
 (f) a plurality of jointly revolving cams that are set in various angular relations with respect to the wheel and are coupled to the wheel for rotation therewith,
 (g) a first group of switches which are individually operated when their respective aforementioned associated cams attain a predetermined angular position, and
 (h) said switches selectively controlling the electrically powered drive mechanism coordinately to position the tabletop in noninterfering relation with objects as the table body is angulated.

2. The invention set forth in claim 1 including:
 (a) a closed loop chain substantially coextensive with the table body and a sprocket on the driven shaft, which sprocket is engaged with the chain to translate the chain and the tabletop, (b) clamping means mounted on the tabletop and engageable with the chain, said clamping means being positionable at predetermined locations on the tabletop for pre-establishing the division of tabletop translation in either longitudinal direction.

3. The invention set forth in claim 1 including:
 (a) a second group of switches that are angularly spaced about the transverse tilting axis of the table and means for operating the switches consecutively during tilting of the table body,
 (b) a logic circuit having the second group of switches connected therein with the aforementioned first group to establish conditions of operation for the electrically powered drive mechanisms for the table body and tabletop in accordance with relationship between the table tilt angle and the position of the tabletop.

4. A device for avoiding the interference between a floor and other objects surrounding a tilting X-ray table which has a top that is advanceable and retractable in opposite longitudinal directions from a normal position, said device comprising:
 (a) a tabletop driving motor and electric control system therefor,
 (b) a shaft that is coupled with the top driving motor for rotation thereby,
 (c) said shaft also having means coupled with an X-ray tabletop to advance and retract the top selectively in either longitudinal direction,
 (d) pin means connected with the shaft for being driven orbitally when the shaft rotates,
 (e) a second shaft having a toothed-wheel thereon which is engageable by the orbiting pin to advance the wheel one angular step for each increment of continuous movement of a tabletop,
 (f) a plurality of cams that are rotated along with the wheel and the second shaft, and a first set of switches that are operable at predetermined times by their respective associated cams,
 (g) the cams each being rotatably adjustable on the shaft to predetermined angular relationships with respect to a given point on the toothed-wheel,
 (h) said switches being operated successively by the cams in dependence on the direction and amount of extension of the tabletop,
 (i) a second set of switches that are operated respectively in accordance with the tilt angle of the X-ray table,
 (j) a table tilting motor, and
 (k) a control circuit for each motor, said sets of switches being incorporated in the control circuits for coordinating operation of the motors in dependence on the relationship between the position of the top and the tilt angle of the table.

References Cited

UNITED STATES PATENTS 3,131,301   4/1964   Barrett et al. _____ 250—55
3,306,605   2/1967   Griffith _____ 269—323

RALPH G. NILSON, Primary Examiner

A. L. BIRCH, Assistant Examiner

U.S. Cl. X.R.
269—323